(12) United States Patent
Kendig et al.

(10) Patent No.: US 8,541,073 B2
(45) Date of Patent: Sep. 24, 2013

(54) COMPOSITION COMPRISING ETHYLENE COPOLYMERS AND POLYOLEFIN

(75) Inventors: Terrance D. Kendig, Newark, DE (US); Stephen Robert Tanny, Newark, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/311,103

(22) Filed: Dec. 5, 2011

(65) Prior Publication Data

US 2012/0074020 A1     Mar. 29, 2012

Related U.S. Application Data

(63) Continuation of application No. 11/031,916, filed on Jan. 7, 2005.

(60) Provisional application No. 60/535,107, filed on Jan. 8, 2004, provisional application No. 60/540,238, filed on Jan. 29, 2004, provisional application No. 60/588,230, filed on Jul. 15, 2004.

(51) Int. Cl.
  *B29D 23/00* (2006.01)
  *B32B 27/10* (2006.01)
  *B32B 27/08* (2006.01)

(52) U.S. Cl.
  USPC ......... 428/34.1; 439/35.7; 439/511; 439/513; 439/514; 439/516; 439/520

(58) Field of Classification Search
  USPC ............... 428/522, 34.1, 35.7, 511, 513, 514, 428/516, 520
  See application file for complete search history.

(56) References Cited

U.S. PATENT DOCUMENTS

| | | |
|---|---|---|
| 3,928,523 A | 12/1975 | Ward et al. |
| 4,043,959 A | 8/1977 | Frye |
| 4,140,733 A | 2/1979 | Meyer, Jr. et al. |
| 4,192,788 A | 3/1980 | Dodson |
| 4,273,893 A | 6/1981 | Karim et al. |
| 4,337,298 A * | 6/1982 | Karim et al. .................. 428/461 |
| 4,684,554 A | 8/1987 | Ou-Yang |
| 5,051,297 A | 9/1991 | Reich et al. |
| 5,516,583 A | 5/1996 | Zhang et al. |
| 5,574,108 A | 11/1996 | Antonov et al. |
| 5,620,802 A | 4/1997 | Arsac et al. |
| 5,626,929 A | 5/1997 | Stevenson |
| 5,830,547 A | 11/1998 | MacKenzie et al. |
| 5,958,531 A | 9/1999 | Stevenson |
| 6,433,088 B1 | 8/2002 | Saraf |
| 7,056,573 B2 | 6/2006 | Murschall et al. |
| 2002/0037965 A1 | 3/2002 | Kinoshita et al. |
| 2003/0130429 A1 | 7/2003 | Bouilloux et al. |
| 2003/0203141 A1 | 10/2003 | Blum et al. |

FOREIGN PATENT DOCUMENTS

| | | |
|---|---|---|
| EP | 0399439 A2 | 11/1990 |
| JP | 57195135 | 9/1993 |
| JP | 61183371 | 9/1993 |
| JP | 6031876 A | 4/1994 |
| JP | 7207074 A2 | 8/1995 |
| JP | 9109324 A2 | 4/1997 |
| JP | 2001019810 A | 4/2001 |
| WO | 97/28960 A2 | 8/1997 |
| WO | 03/093364 A1 | 11/2003 |
| WO | 2005/017008 A1 | 2/2005 |

OTHER PUBLICATIONS

PCT International Search Report for PCT/US2005/00686, dated May 12, 2005.

* cited by examiner

*Primary Examiner* — Kevin R Kruer

(57) ABSTRACT

Disclosed are compositions of ethylene/(meth)acrylate copolymers, polyolefins (e.g., polyethylene and polypropylene), optional tackifier resins and optional fillers that provide very strong, tight hermetic heat seals yet are easily peelable. These compositions are useful as an adhesive layer in multilayer structures that are useful as packaging lidding films. Also disclosed are packages that comprise these multilayer structures.

7 Claims, No Drawings

COMPOSITION COMPRISING ETHYLENE COPOLYMERS AND POLYOLEFIN

The application is a continuation of Ser. No. 11/031,916, filed Jan. 7, 2005, now pending; which claims the priority to U.S. provisional application Nos. 60/535,107, filed Jan. 8, 2004, 60/540,238, filed Jan. 29, 2004, and 60/588,230, filed Jul. 15, 2004, the entire disclosures of all applications are incorporated herein by reference.

The invention relates to a composition comprising a polyolefin (e.g., polyethylene and polypropylene) and an ethylene copolymer, to a multilayer structure comprising the composition, and to a package comprising the multilayer structure.

BACKGROUND OF THE INVENTION

The packaging industry uses a wide variety of films and containers prepared from various thermoplastic resins and compositions for packaging food and non-food products. These packages provide adequate protection (for example, protection from mechanical damage, barriers to air or moisture, etc.) of the product contained within until the consumer is ready to use the product. It is also desirable for the package to be designed to allow the consumer easy access to the product at the appropriate time. Often, packages consist of rigid containers made from metal (particularly aluminum), paper, fiberboard or plastic (for example, polypropylene, crystallized polyethylene terephthalate (CPET) and high-impact polystyrene (HIPS)) with a lidding film sealed to the container. It is desirable that the seal between the container and the lidding film provide a strong hermetic seal to protect the product and that the seal is easily and cleanly peeled by the consumer.

Common compositions used for sealants for lidding include compositions comprising polypropylene, polyethylene, ethylene vinyl acetate copolymers (EVA), ethylene/(meth)acrylate copolymers or amorphous polyester. They can also contain fillers or additives for achieving an easy peel characteristic. Many compositions comprising polyolefins are currently used for peelable heat seals in packaging applications because of their good processability, low cost, and adequate adhesion for many applications. However, these compositions are not sufficiently robust for all applications. For example, many packages are refrigerated or frozen to help preserve the product therein, and it is desirable to retain seal strength in cold temperatures. Also, polyolefin compositions (for example, those that contain EVA) have limited heat resistance that restricts their ability to be processed at high temperatures.

Therefore, it is desirable to develop compositions that provide improved performance than currently provided by commercially available sealants.

SUMMARY OF THE INVENTION

The invention provides a composition comprising or consisting essentially of or produced from (a) from about 10 to about 80 weight % of at least one ethylene copolymer; (b) from about 5 to about 60 weight % of at least one polyolefin; (c) from 0 to about 35 weight % of at least one tackifying resin; and (d) from 0 to about 35 weight % of filler. The ethylene copolymer refers to ethylene/(meth)acrylate copolymer, ethylene/alkyl acrylate copolymer, ethylene/(meth)acrylic acid copolymer, ethylene/alkyl acrylic acid copolymer, an ionomer thereof, or combinations of two or more thereof.

The invention also provides a multilayer structure comprising or produced from at least one layer of the composition disclosed above and at least one additional layer comprising foil, paper, polyester, polyamide, polyolefin, polyethylene vinyl alcohol, polyethylene vinyl acetate, ethylene copolymer or ionomer thereof, polyvinyl chloride, polyvinylidene chloride, or anhydride-modified polyolefin.

The invention further provides a package comprising or produced from the composition and multilayer structure disclosed above.

The invention also provides a package comprising (1) a container comprising a structure comprising at least one layer of foil, paperboard, glass, high-density polyethylene (HDPE), polypropylene (PP), high-impact polystyrene (HIPS), expanded polystyrene (EPS), acrylic homopolymer or acrylic copolymer, polycarbonate, polysulfone, amorphous polyethylene terephthalate (APET), crystalline polyethylene terephthalate (CPET), polyvinyl chloride (PVC), polychlorotrifluoroethylene (PCTFE), polyacrylonitrile homopolymer or copolymer, polyacetal, or polyacetal copolymer; and (2) a peelable lid comprising a multilayer structure disclosed above.

DETAILED DESCRIPTION OF THE INVENTION

All references disclosed herein are incorporated by reference.

The term "(meth)acrylic acid" means methacrylic acid and/or acrylic acid. Likewise, the term "(meth)acrylate" means methacrylate and/or acrylate.

Thermoplastic compositions are polymeric materials that can flow when heated under pressure. Melt index (MI) is the mass rate of flow of a polymer through a specified capillary under controlled conditions of temperature and pressure. Melt indices reported herein are determined according to ASTM 1238 at 190° C. using a 2160 g weight, with values of MI reported in g/10 minutes. The thermoplastic compositions are suitable for preparation of films and multilayer structures by extrusion processing.

The term "foil" refers to a thin, flexible film or sheet of metal, such as aluminum. It also refers to multilayer structures in which at least one layer of aluminum is adhered to additional layers of other materials, provided at least one exterior layer of the multilayer structure is a layer of aluminum.

Peelable heat seals commonly can be designed to have three different failure modes when peeling seal to seal or seal to differentiated substrate. Failure can be interfacial, delamination or cohesive when peeling one from the other under stress at various angles of peel and speeds. Interfacial seals are designed to fail at the heat seal interface of the selected sealing surface (i.e., the sealant layer peels cleanly away from the substrate layer). In most cases seal strength is determined by temperature, pressure and dwell time. Seals that do not peel cleanly can contaminate the contents of the package with fragments of the seal or lidding. Interfacial peelable seals are desirable to prevent such contamination. Delamination heat seals are designed to fail at an internal interface of a multilayer film structure. This designed failure interface is in a chosen layer somewhere behind the actual heat seal layer in the film structure. Thickness and adhesion to the chosen internal layer interface will determine strength of the seal during peeling. In this case the entire sealant layer transfers to the substrate as the film structure is being peeled away. Cohesive seal failure by design fails within the actual sealant layer itself. When peeling the seal under stress and speed, the seal layer itself splits within and transfers a portion of the sealant material to the sealant substrate. Internal strength of the sealant material is the determining factor for actual strength of the heat seal.

The composition can include or consist essentially of (a) from about 10 to about 80 weight % of at least one ethylene/alkyl(meth)acrylate copolymer; (b) from about 5 to about 60 weight % of at least one polyolefin; (c) from about 0.5 to about 35 weight % of at least one tackifying resin; and (d) from 0 to about 35 weight % of filler.

The composition can also comprise or consist essentially of or be produced from (a) from about 40 to about 80 weight % of at least one ethylene/alkyl(meth)acrylate copolymer; (b) from about 20 to about 60 weight % of at least one polyolefin. The composition can also consist essentially of (a) from about 10 to about 80 weight % of at least one ethylene/alkyl(meth)acrylate copolymer; (b) from about 20 to about 60 weight % of at least one polyolefin; and (c) from about 10 to about 20 weight % of at least one tackifying resin or (a) from about 40 to about 60 weight % of at least one ethylene/alkyl(meth)acrylate copolymer; (b) from about 20 to about 40 weight % of at least one polyolefin; (c) from about 10 to about 20 weight % of at least one tackifying resin; and (d) from about 5 to about 20 weight % of filler.

The terms "ethylene copolymer" means a thermoplastic copolymer derived from the copolymerization of ethylene monomer and at least one alkyl acrylate or alkyl methacrylate comonomer, wherein the alkyl group contains from 1 to 8 carbon atoms. Ethylene/alkyl(meth)acrylate copolymer and ethylene/(meth)acrylate copolymer are used interchangeably herein. For example, alkyl acrylates include methyl acrylate, ethyl acrylate and butyl acrylate. "Ethylene/methyl acrylate (EMA)" means a copolymer of ethylene (E) and methyl acrylate (MA). "Ethylene/ethyl acrylate (EEA)" means a copolymer of ethylene (E) and ethyl acrylate (EA). "Ethylene/butyl acrylate (abbreviated EBA)" means a copolymer of ethylene (E) and butylacrylate (BA).

The amount of the alkyl acrylate comonomer incorporated into the ethylene/(meth)acrylate copolymer can, in principle, vary broadly from about 1 weight percent to as high as 40 weight percent of the total copolymer or even higher. The choice of the alkyl group can be methyl group up to an eight-carbon atom alkyl group with or without branching. For example, the alkyl group in the alkyl(meth)acrylate comonomer used to prepare the ethylene copolymer can be from one to 4 carbon atoms and the alkyl(meth)acrylate comonomer can have a concentration range of from 5 to 30, or 9 to 27 weight percent, of the total ethylene/(meth)acrylate copolymer. Methyl acrylate (the most polar alkyl acrylate comonomer) can be used to prepare an ethylene/methyl acrylate dipolymer. The methyl acrylate comonomer can be present in a concentration range of from 5 to 30, 9 to 25, or 9 to 24 weight %, of the ethylene copolymer.

A mixture of two or more ethylene copolymers can be used as component (a) in the compositions in place of a single copolymer. Particularly useful properties may be obtained when two properly selected ethylene/alkyl acrylate copolymers are used in blends. For example but not limitation, compositions include those wherein the ethylene/alkyl acrylate component comprises two different ethylene/methyl acrylate copolymers. Also for example, one may replace a single EMA grade in a blend with an equal amount of a properly selected mixture of two EMA grades, where the mixture has the same weight percent methyl acrylate content and melt index as the single EMA grade replaced. By combining two different properly selected EMA copolymer grades, modification of the properties of the composition may be achieved as compared with compositions containing only a single EMA resin grade.

The ethylene/alkyl(meth)acrylate copolymers may also optionally include at least one additional comonomer including (meth)acrylic acid, maleic anhydride, glycidyl methacrylate and carbon monoxide to form terpolymers such as ethylene/isobutyl acrylate/methacrylic acid, ethylene/methyl acrylate/maleic anhydride, ethylene/butyl acrylate/glycidyl methacrylate (EBAGMA) and ethylene/butyl acrylate/carbon monoxide (EBACO).

Ethylene/(meth)acrylate copolymers can be prepared by processes well known in the polymer art using either autoclave or tubular reactors. The copolymerization can be run as a continuous process in an autoclave. For example, ethylene, an alkyl(meth)acrylate such as methyl acrylate, and optionally a solvent such as methanol (see, e.g., U.S. Pat. No. 5,028,674) are fed continuously into a stirred vessel such as autoclave of the type disclosed in U.S. Pat. No. 2,897,183, together with an initiator. The rate of addition may depend on polymerization temperature, pressure, and concentration of methyl acrylate monomer in the reaction mixture needed to achieve the target composition of the copolymer. In some cases, it may be desirable to use a telogen such as propane, to control the molecular weight. The product mixture can be continuously removed from the vessel. After the product mixture leaves the reaction vessel, the copolymer can be separated from the unreacted monomers and solvent (if used) by conventional means, e.g., vaporizing the nonpolymerized materials and solvent under reduced pressure and at an elevated temperature. Autoclave acrylate copolymers are available from Voridian under the name EMAC and from ExxonMobil under the name Optema and from Atofina under the name of Lotryl.

Tubular reactor produced ethylene/(meth)acrylate copolymer can be distinguished from the more conventional autoclave produced ethylene/(meth)acrylate as generally known in the art. Thus the term or phrase "tubular reactor produced" ethylene/(meth)acrylate copolymer denotes an ethylene copolymer produced at high pressure and elevated temperature in a tubular reactor or the like, wherein the inherent consequences of dissimilar reaction kinetics for the respective ethylene and alkyl(meth)acrylate (e.g. methyl acrylate) comonomers is alleviated or partially compensated by the intentional introduction of the monomers along the reaction flow path within the tubular reactor. As generally recognized in the art, such a tubular reactor copolymerization technique will produce a copolymer having a greater relative degree of heterogeneity along the polymer backbone (a more blocky distribution of comonomers), will tend to reduce the presence of long chain branching and will produce a copolymer characterized by a higher melting point than one produced at the same comonomer ratio in a high pressure stirred autoclave reactor.

Tubular reactor produced ethylene/(meth)acrylate copolymers of this nature are commercially available from E.I. du Pont de Nemours and Company (DuPont), Wilmington, Del.

The manufacturing of the tubular reactor ethylene/(meth) acrylate copolymers in a high pressure, tubular reactor at elevated temperature can include additional introduction of reactant comonomer along the tube and not merely manufactured in a stirred high-temperature and high-pressure autoclave type reactor. Similar ethylene/(meth)acrylate copolymeric material can be produced in a series of autoclave reactors where comonomer replacement is achieved by multiple zone introduction of reactant comonomer as disclosed in U.S. Pat. Nos. 3,350,372; 3,756,996; and 5,532,066, and as such these high melting point materials can be considered equivalent to tubular reactor produced copolymers for purposes of this invention. These products are available from Voridian under the name EMAC+ or EBAC+.

To further illustrate and characterize the tubular reactor produced ethylene/alkyl acrylate copolymer relative to conventional autoclave produced copolymer, the following list of commercially available ethylene/methyl acrylate copolymers with associated melting point data show that tubular reactor produced EMA resins have considerably higher melting points versus autoclave EMA's due to a very different MA distribution along polymer chains:

Autoclave Produced Copolymers
  ExxonMobil, N.J.; EMA (21.5 wt % MA) mp=76° C.
  ExxonMobil, N.J.; EMA (24 wt % MA) mp=69° C.
  Atofina, France; EMA (20 wt % MA) mp=80° C.
  Atofina, France; EMA (24 wt % MA) mp=73° C.
Tubular Reactor Produced Copolymers
  DuPont EMA (25 wt % MA) mp=88° C.
  DuPont EMA (20 wt % MA) mp=95° C.

For additional discussion regarding the differences between tubular reactor produced and autoclave produced ethylene/alkyl acrylate copolymers, see Richard T. Chou, Mimi Y. Keating and Lester J. Hughes, "High Flexibility EMA made from High Pressure Tubular Process", Annual Technical Conference—Society of Plastics Engineers (2002), 60th (Vol. 2), 1832-1836. CODEN: ACPED4 ISSN: 0272-5223; AN 2002:572809 CAPLUS.

Ethylene/alkyl acrylate copolymers suitable for use in this invention are available from DuPont. See Table A for specific examples of ethylene/alkyl acrylate copolymers available from DuPont.

TABLE A

| Ethylene Alkyl Acrylate Copolymer | Alkyl acrylate wt % | Melt Flow (g/10 min) |
|---|---|---|
| EMA-1 | 25 | 0.4 |
| EMA-2 | 25 | 0.6 |
| EMA-3 | 9 | 2 |
| EMA-4 | 14 | 2 |
| EMA-5 | 18 | 2 |
| EMA-6 | 24 | 2 |
| EMA-7 | 9 | 6 |
| EMA-8 | 20 | 8 |
| EMA-9 | 13 | 9 |
| EEA-1 | 12 | 1 |
| EEA-2 | 16 | 1 |
| EEA-3 | 15 | 6 |
| EEA-4 | 15 | 7 |
| EBA-1 | 7 | 1.1 |
| EBA-2 | 7 | 1.1 |
| EBA-3 | 17 | 1.5 |
| EBA-4 | 17 | 1.8 |
| EBA-5 | 27 | 4 |
| EBA-6 | 17 | 7 |

The ethylene/(meth)acrylate copolymers available for use can vary in molecular weight, indicated by the range of melt index (MI), numerically in terms of a fraction up to about 10, provided in Table A. The specific selection of the MI grade of polymer component(s) to be used may be influenced by the process used to create the multilayer structure. Preferred are ethylene copolymers having MI's from about 0.1 to about 100 g/10 min., or from about 0.5 to about 50, or from about 0.50 to about 30 g/10 min.

Polyolefins can include homopolymers and copolymers of olefins having from 2 to 8 carbon atoms. Examples of polyolefins include polyethylene homopolymers, polypropylene homopolymers, copolymers comprising ethylene, and copolymers comprising propylene. Polyethylenes (PE) can be prepared by a variety of methods, for example but not limitation, the well-known Ziegler-Natta catalyst polymerization (see e.g., U.S. Pat. Nos. 4,076,698 and 3,645,992), metallocene catalyst polymerization (see, e.g., U.S. Pat. Nos. 5,198,401 and 5,405,922), Versipol® catalyst polymerization and by free radical polymerization. The polymerization can be conducted as solution phase processes, gas phase processes, and the like. Polyethylenes can include linear polyethylenes such as high density polyethylene (HDPE), linear low density polyethylene (LLDPE), very low or ultralow density polyethylenes (VLDPE or ULDPE) and branched polyethylenes such as low density polyethylene (LDPE). The densities of PE suitable for use in the present invention range from about 0.865 g/cc to about 0.970 g/cc. A polyethylene of note is a copolymer of ethylene and 1-butene. Such a copolymer with 12.6 weight % 1-butene, having a melt index of 3.5 is available as Exact® 3035 from ExxonMobil. Another polyethylene of note is a copolymer of ethylene and 1-octene. Such a copolymer with 12 weight % octene, having a melt index of 3.5 is available as Engage® 8450 from DuPont Dow Elastomers.

Polypropylene (PP) polymers include homopolymers, random copolymers, block copolymers and terpolymers of propylene. Copolymers of propylene include copolymers of propylene with other olefins such as ethylene, 1-butene, 2-butene and the various pentene isomers, etc. and preferably copolymers of propylene with ethylene. Terpolymers of propylene include copolymers of propylene with ethylene and one other olefin. Random copolymers, also known as statistical copolymers, are polymers in which the propylene and the comonomer(s) are randomly distributed throughout the polymeric chain in ratios corresponding to the feed ratio of the propylene to the comonomer(s). Block copolymers are made up of chain segments consisting of propylene homopolymer and of chain segments consisting of, for example, random copolymer of propylene and ethylene. The term "polypropylene" refers to any or all of the polymers comprising propylene described above.

Homopolymers and random copolymers can be manufactured by any known process. For example, polypropylene polymers can be prepared in the presence of catalyst systems of the type known as Ziegler-Natta, based on organometallic compounds and on solids containing titanium trichloride. Block copolymers can be manufactured similarly, except that propylene is generally first polymerized by itself in a first stage and propylene and additional comonomers such as ethylene are then polymerized, in a second stage, in the presence of the polymer obtained during the first. Each of these stages can be carried out, for example, in suspension in a hydrocarbon diluent, in suspension in liquid propylene, or else in gaseous phase, continuously or noncontinuously, in the same reactor or in separate reactors. Additional information relating to block copolymers and to their manufacture may be found particularly in chapters 4.4 and 4.7 of the work "Block Copolymers" edited by D.C. Allport and W. H. Janes, Applied Science Publishers Ltd (1973).

The polyolefins can also be modified by the incorporation of low levels (typically less than about 3 weight %) of one or more polar monomers including, for example but not limitation vinyl acetate, alkyl acrylates, carbon monoxide, glycidyl methacrylate, (meth)acrylic acid and maleic anhydride. The incorporation of these polar comonomers can be accomplished by copolymerization or by grafting.

Blends of two or more polyolefins can be used. For example, LLDPE can be blended with either LDPE or HDPE to provide polyethylene blends or a blend of PP and poly(1-butene) (PB).

The composition may optionally contain tackifying resins. Any tackifier, also referred to as adhesive, known to one skilled in the art such as those disclosed in U.S. Pat. No. 3,484,405 can be used. Such tackifiers include a variety of natural and synthetic resins and rosin materials. The resins can be liquid, semi-solid to solid, or solid, including complex amorphous materials generally in the form of mixtures of organic compounds having no definite melting point and no tendency to crystallize. Such resins may be insoluble in water and can be of vegetable or animal origin, or can be synthetic resins. The resins can provide substantial and improved tackiness to the composition. Suitable tackifiers include, but are not limited to, para-coumarone-indene resins, terpene resins, butadiene-styrene resins, polybutadiene resins, hydrocarbon resins, rosins, and combinations of two or more thereof.

Generally the coumarone-indene resins have a molecular weight ranging from about 500 to about 5,000. Examples of resins of this type that are available commercially include those materials marketed as "Picco"-25 and "Picco"-100.

The terpene resins include styrenated terpenes and can have a molecular weight ranging from about 600 to 6,000. Examples of commercially available resins are marketed as "Piccolyte" S-100, as "Staybelite Ester" #10 (Eastman Chemical, Kingsport, Tenn.), which is a glycerol ester of hydrogenated rosin, and as "Wingtack" 95, which is a polyterpene resin. A terpene resin-based tackifier of note is derived from poly-limonene, a monomer recovered from the citrus industry, available as Piccolyte® C115 from Pinova.

The butadiene-styrene resins can have a molecular weight ranging from about 500 to about 5,000. Example of commercial product is marketed as "Buton" 100, a liquid butadiene-styrene copolymer resin having a molecular weight of about 2,500.

The polybutadiene resins can have a molecular weight ranging from about 500 to about 5,000. A commercially available example is that marketed as "Buton" 150, a liquid polybutadiene resin having a molecular weight of about 2,000 to about 2,500.

A hydrocarbon resin can be produced by catalytic polymerization of selected fractions obtained in the refining of petroleum, and can have a molecular weight ranging from about 500 to about 5,000. Examples of such resin are those marketed as "Piccopale"-100, and as "Amoco" and "Velsicol" resins. Similarly, polybutenes obtained from the polymerization of isobutylene may be included as a tackifier.

The tackifier may also include rosin materials, low molecular weight (such as, for example, 1300) styrene hard resins such as the material marketed as "Piccolastic" A-75, disproportionated pentaerythritol esters, and copolymers of aromatic and aliphatic monomer systems of the type marketed as "Velsicol" WX-1232. The rosin that may be employed in the present invention may be gum, wood or tall oil rosin but preferably is tall oil rosin. Also the rosin material may be modified rosin such as dimerized rosin, hydrogenated rosin, disproportionated rosin, or esters of rosin. Esters can be prepared by esterifying the rosin with polyhydric alcohols containing from 2 to 6 alcohol groups.

Another tackifier resin of note is Regalite R1125 (a hydrocarbon) available from Eastman Chemical.

A more comprehensive listing of tackifiers, can be found in the TAPPI CA Report #55, February 1975, pages 13-20, a publication of the Technical Association of the Pulp and Paper Industry, Atlanta, Ga., which lists well over 200 tackifier resins that are commercially available.

The tackifier may be either combined directly with the ethylene copolymer or other components disclosed; or pre-melt compounded into a masterbatch formulation. Such technology is described in U.S. Pat. No. 6,255,395 and JP 2002 173,653, entire disclosures of both are incorporated herein. For example, poly-limonene may be blended with an ethylene/octane copolymer to prepare a tackifier masterbatch that can be added to the remaining components of the composition in a subsequent blending operation.

Two or more individual tackifiers can be blended.

The compositions of this invention may also optionally contain fillers. Addition of fillers can increase the temperature resistance and affect peel seal characteristics of the composition.

A filler can comprise particles of inorganic compounds, such as minerals and salts. The filler can be included in the composition on a weight basis as a function of the density of the filler. Particle size and shape of the filler also may have an effect on properties of blends. Fine particle size fillers generally have a tendency to result in higher blend viscosities and they are also more expensive. No. 9 Whiting (about 95% through 325 mesh) represents a viable midpoint in coarseness, availability, and cost. More preferred fillers are calcium carbonate and talc (essentially $Mg_3Si_4O_{10}(OH)_3$), and most preferred is talc. The amount of filler present in the composition of the present invention can be from about 0.001 to about 30 weight %.

Fillers may be pre-blended with an ethylene/alkyl acrylate or polyolefin in a masterbatch prior to blending into a composition of this invention. For example, talc may be blended with ethylene/methyl acrylate (20 weight % MA) copolymer to prepare a filler masterbatch that can be added to the remaining components of the composition in a subsequent blending operation.

Fillers may also be polymeric materials that are not fully compatible with the combination of ethylene/alkyl(meth) acrylate of component (a) and the polyolefin of component (b) such as, for example, polystyrenic resins, referring to homopolymers of styrene or α-methylstyrene or copolymers of styrene with unsaturated monomers such as, but not limited to ethylene, butene, butadiene, or isoprene. Specific examples include, but are not limited to ethylene/styrene random or block copolymers, ethylene/butadiene random or block copolymers and hydrogenated and partially hydrogenated butadiene/styrene copolymers. Also useful are polystyrenics further modified for enhanced impact properties and usually referred to as High Impact Polystyrene or HIPS. Blends and mixtures of polystyrenics may be used. Specific examples include but are not limited to, HIPS from Nova Chemicals or ethylene/styrene copolymers sold by Dow Chemical.

Other additives can be present such as antioxidants and thermal stabilizers, ultraviolet (UV) light stabilizers, colorants, pigments and dyes, fillers, delustrants, anti-slip agents, plasticizers, anti-block agents, compatibilizers, components for modifying surface characteristics such as Coefficient of Friction (COF), anti static and anti fog agents, other processing aids and the like. These additives may be present in the compositions in quantities that are generally from 0.001 to 20, or from 0.01 to 15 weight %, so long as they do not detract from the adhesion functionality of the composition (the weight percentages of such additives are not included in the total weight percentages of the composition as defined above in the Summary of the Invention). Typically, many such additives may be present in from 0.01 to 5 weight %. Of note are antioxidants that may be present in from 0.01 to 1 weight %.

Antioxidants are available under the trade name Irganox from Ciba Geigy Inc., Tarrytown, N.Y. For example, phenolic antioxidants such as Irganox E201, CAS Number 10191-41-0) or its derivatives may be added to the composition. Irganox 1010, CAS Number 6683-19-8, is another antioxidant suitable for use in this invention. Also of note are additives for modifying surface characteristics such as coefficient of friction, for anti-blocking or for chill roll release that may be present in amounts from 0.001 to 5 weight %. For example, such an additive is a dispersion of silicon dioxide (2 weight %) in an ethylene/methacrylic acid copolymer used as carrier concentrate for blending into a resin (available from DuPont as Conpol® 20B).

The optional incorporation of such additives into the compositions can be carried out by any known process, for example, by dry blending, extruding a mixture of the various constituents, the conventional masterbatch technique, or the like.

The adhesive resin composition of this invention may be produced by mixing predetermined amounts of the ethylene/(meth)acrylate copolymer component (a), the polyolefin (b) optionally the tackifier (c), and optionally the filler (d) by a mixer such as a Henschel mixer, a V blender, a ribbon blender or a tumbler blender; or after mixing, melt-kneading the mixture by a single screw extruder, a twin screw extruder, a kneader, a Banbury mixer, etc. and then pelletizing, melt extruding, granulating or pulverizing the mixture.

Upon proper melt blending or heat mixing, the composition can be extruded through a die via coextrusion. The thickness of the extruded sealant is preferably about 1 to 400 microns, more preferably 5 to 100 microns, yet more preferably 10 to 30 microns.

Alternatively, the compositions of the present invention can be extruded into a film having a thickness of about 1 to 100 microns, more preferably 5 to 100 microns and yet more preferably 10 to 75 microns and subsequently laminated to paper, foil, or film as part of a multilayer structure.

The adhesive resin composition of this invention can be used to bond various substrates or polymers to each other. Typically, the articles are bonded or adhered by heat seal.

The final adhesive composition can be used directly, for example in a melt coextrusion, or it can be extruded in rope or pellet form or reduced to a chip or powder form for use in an appropriate applicator. It can be cast or extruded into a film or web form for subsequent use. In such shaped forms, it can be placed between the substances to be bonded and then activated by heat and pressure. The adhesives can be applied by any of the hot melt applicators commonly used.

Although these compositions can be applied in any thickness the practitioner finds expedient, it is preferred to employ layer thickness of from 0.0002 mils to 10 mils (0.0000005-0.025 cm).

The invention further provides a seal or laminate suitable for application to containers, packages, films and the like by heat sealing, which has a good heat sealing property and can be easily peeled.

Films and coatings can be made from the compositions and laminated or coated onto other films or structures. Alternatively, the composition can be simultaneously coextruded with other materials. To summarize, the adhesive resin compositions disclosed here have utility due to chemical and physical properties as bonding agents and adhesives to provide so-called peel and seal adhesives and can be used in forms such as adhesive sheets, tapes, or laminated products.

The compositions can also be useful in providing heat seals for sealing to polyvinyl chloride (PVC), polyvinylidene chloride (PVDC), PP, polyethylene terephthalate (PET) and polystyrene where peelable seals are desired. The compositions can provide wide levels of seal strength range and a broader, higher-temperature operating window over existing heat sealable systems.

Existing alternative sealant systems are solvent-borne systems generally based on EVA or amorphous PET and applied by roller or gravure systems to a carrier web. These coatings are generally very thin and are limited to ingredients that are soluble in solvent systems. The invention is not limited by sealant layer thickness or combination of components to gain the desired heat seal strength or peelability desired. The sealant disclosed here can be free of solvent and address environmental concerns regarding solvent use. No-solvent sealing systems can be simpler and offer more flexibility, which may improve economics in manufacturing of the finished sealant web.

The invention also includes an improved heat sealable material to provide peelable, hermetic seals at a wide range of seal strengths to containers made from PCTFE fluoropolymers (a number of homopolymers and copolymers derived from polymerization of chlorotrifluoroethylene are available commercially under the tradename Aclar® from Honeywell, Inc., Morristown, N.J.). PCTFE may provide high moisture and oxygen barrier properties, allowing greater shelf life of the product packaged. PCTFE fluoropolymers provide barrier properties comparable to foil. Use of PCTFE may be limited if a composition cannot provide good adhesion to fluoropolymers such as PCTFE.

A PCTFE layer can be adhered directly to a second layer of PVC to create the structure from which the container is formed. The PVC is used as the sealing surface as it has high affinity to many heat sealable materials. It also provides bulk to the structure, as it is less expensive than the PCTFE. Both materials provide high clarity and formability. PVC as the seal surface may have insufficient oxygen and moisture barrier properties. When the top barrier sealant web is heat sealed to the PVC, the barrier properties of the PCTFE cannot be fully realized. Oxygen and moisture permeate through the PVC between the heat-sealable lidding material and the PCTFE, leading to shortened shelf life.

The PCTFE can become the innermost layer and seal substrate for the heat sealable top web, allowing the final package to realize the full barrier properties of the PCTFE, leading to longer shelf life. Also, not as much thinning of the PCTFE occurs in the forming process by making the PCTFE the inside layer instead of the outside layer. This can allow for a high barrier, peelable lidding that provides an easily opened, transparent package with improved shelf life.

The sealant materials disclosed here can be useful to the pharmaceutical industry in blister packaging and nonmedicaments that are user-friendly to patients and other users of the package. It can provide an attractive and inexpensive package for the merchandising of pharmaceutical and other products that is constructed in a manner that facilitates mass production. The packages may contain one to a multiplicity of articles, such as food, medicaments in the form of capsules, tablets, medical instruments, syringes, lozenges, pills and/or the like, or nonmedicaments, such as poisons, catalysts, cleaning compositions, batteries, and other goods that need to be protected from oxygen and moisture.

Films comprising the compositions of this invention can be made by virtually any method known to one skilled in this art. The film can be either a single layer or multilayer polymeric film. As such, the film and film structures can be typically cast, extruded, co-extruded, laminated, and the like, including orientation (either uniaxially or biaxially) by various methodologies (e.g., blown film, mechanical stretching or the like).

The invention further directs to a monolayer, or multilayer coextruded or laminated structure that involves the adhesive described herein as a layer, typically a heat seal layer, to provide a bond between other packaging components. The peel seal strength of these compositions allows for bonding of various lidding substrates, including substrates made from ethylene vinyl acetate, polyethylene, polystyrene, polypropylene, polyethylene terephthalate, polyvinyl chloride, metals such as aluminum, spun-bonded polyolefins such as TYVEK® (commercially available from DuPont), oriented polyesters such as MYLAR® (DuPont), and the like, can be adjusted by varying the amount and type of ethylene/(meth) acrylate copolymer, polyolefin content tackifier and/or filler in the adhesive composition.

The invention also provides a multilayer structure comprising at least one layer prepared from a composition disclosed herein and at least one additional layer comprising foil, paper, polyester, polyamide, polyolefin, polyethylene vinyl alcohol, polyethylene vinyl acetate, ethylene/(meth)acrylic acid copolymer and ionomer thereof, polyvinyl chloride, polyvinylidene chloride, and anhydride-modified polyolefin. Multilayer structures of note comprise at least one layer of the compositions of note as defined above. Preferred structures comprise at least one layer of the preferred compositions as defined above.

The multilayer polymeric sheet can involve at least three categorical layers including, but not limited to, an outermost structural or abuse layer, an inner barrier layer, bulking layer and/or adhesive layer, and an innermost layer making contact with and compatible with the intended contents of the package and capable of forming the necessary seals (e.g. most preferably heat-sealable) to itself and the other parts of the package. Other layers may also be present to serve as adhesive or "tie" layers to help bond these layers together.

The outermost structural or abuse layer can be oriented polyester or oriented or non-oriented polypropylene, but can also include oriented or non-oriented polyamide (nylon) or polyethylene such as HDPE or paper or foil. This layer, when optically transparent, preferably is reverse printable and unaffected by the sealing temperatures used to make the package, since the package is sealed through the entire thickness of the multilayer structure. When the outer structural or abuse layer is not optically transparent, this layer can be surface printed and then optionally coated with a protective coating or lacquer. The thickness of this layer can control the stiffness of the film, and may range from about 10 to about 100 μm or from about 12 um to about 50 μm.

The inner layer can include one or more barrier layers, depending on which atmospheric conditions (oxygen, humidity, light, and the like) that potentially can affect the product inside the package. Barrier layers can be, for example, metallized PP or PET), polyethylene vinyl alcohol (EVOH), polyvinyl alcohol, polyvinylidene chloride, polyolefins, aluminum foil, nylon, blends or composites of the same as well as related copolymers thereof. Barrier layer thickness may depend on factors such as the sensitivity of the product and the desired shelf life.

The inner layer can include one or more bulking layers. This layer is usually added to create a structure that has a final, predefined thickness by using a common polymer that is of low cost. Bulking layers can be, for example, polyolefin, polyolefin polar copolymer, polyester and or blends of various bulking layer components. A bulking layer is also suitable for incorporation of regrind and scrap generated in the manufacturing process. For example, scrap generated from material that, for one reason or another, is not suitable for sale, or material that is generated by trimming the edges off a semi-finished roll, can be ground up and incorporated into the inner layer providing bulk at relatively low cost.

The inner layer can include one or more adhesive layers. This adhesive layer is usually designed to adhere the outer structural layer to the inner layer, the inner layer to the innermost layer or, in the case where the inner layer may only be acting as an adhesive, bonding the outer layer directly to the innermost layer.

The innermost layer can be the sealant layer, which can be prepared from the composition disclosed above.

The structure and barrier layers can be combined to comprise several layers of polymers that provide effective barriers to moisture and oxygen and bulk mechanical properties suitable for processing and/or packaging the product, such as clarity, toughness and puncture-resistance. In some applications, the functions of structure and barrier layers may be combined in a single layer of a suitable resin. For example, nylon or PET are suitable for both structure and barrier functions.

Polyamides include aliphatic polyamides, amorphous polyamides, or a mixture thereof. Aliphatic polyamides can refer to aliphatic polyamides, aliphatic copolyamides, and blends or mixtures of these such as polyamide 6, polyamide 6.66, blends and mixtures thereof. Polyamides 6.66 are commercially available under the tradenames "Ultramid®C4" and "Ultramid® C35" from BASF, or under the tradename "Ube®5033FXD27" from Ube Industries Ltd. Polyamide 6 can be commercially available under the tradename Capron® from Honeywell International.

The film may further comprise other polyamides such as those disclosed in U.S. Pat. Nos. 5,408,000; 4,174,358; 3,393,210; 2,512,606; 2,312,966 and 2,241,322.

The film may also comprise partially aromatic polyamides such as the amorphous nylon resins 6-I/6-T commercially available under the tradename Selar® PA from DuPont or commercially available under the tradename Grivory® G 21 from EMS-Chemie AG.

Ionomers are copolymers of an olefin such as ethylene and an unsaturated carboxylic acid, such as acrylic acid or methacrylic acid and optionally softening monomers wherein at least one or more alkali metal, transition metal, or alkaline earth metal cations, such as sodium, potassium or zinc, are used to neutralize some portion of the acidic groups in the copolymer, resulting in a thermoplastic resin exhibiting enhanced properties. For example, "Ethylene/(meth)acrylic acid (E/(M)AA)" means a copolymer of ethylene (E)/acrylic acid (AA) and/or ethylene/methacrylic acid (MAA) which are at least partially neutralized by one or more alkali metal, transition metal, or alkaline earth metal cations to form an ionomer. Terpolymers can also be made from an olefin such as ethylene, an unsaturated carboxylic acid and other comonomers such as alkyl (meth)acrylates to provide "softer" resins that can be neutralized to form softer ionomers. Ionomers are known conventionally and their method of preparation is disclosed in, for example, U.S. Pat. No. 3,344,014.

Anhydride or acid-modified ethylene and propylene homo- and co-polymers can be used as extrudable adhesive layers (also known as "tie" layers) to improve bonding of layers of polymers together when the polymers do not adhere well to each other, thus improving the layer-to-layer adhesion in a multilayer structure. The compositions of the tie layers can depend on the compositions of the adjoining layers that need to be bonded in a multilayer structure. One skilled in the polymer art can select the appropriate tie layer based on the other materials used in the structure. Various tie layer compositions are commercially available under the tradename Bynel® from DuPont.

EVOH having from about 20 to about 50 mole % ethylene can be used. Suitable polyethylene vinyl alcohol copolymers are commercially available under the tradename EVAL® from Kuraray or commercially available under the tradename Soarnol® from Nippon Goshei.

PVDC polymers and copolymers suitable for use herein as coatings or films can be obtained commercially from Dow Chemical under the tradename Saran®, for example.

The manufacture of a film used in this invention from the compositions disclosed above can be carried out according to any known methods. It is possible, for example, to manufacture a primary film by extruding the compositions using so-called "blown film" or "flat die" methods. A blown film can be prepared by extruding a polymer composition through an annular die and expanding the resulting tubular film with an air current to provide a blown film. Cast flat films can be prepared by extruding a composition through a flat die. The film leaving the die is cooled by at least one roll containing internally circulating fluid (a chill roll) or by a water bath to provide a cast film. The film can be sized by conventional techniques such as slitting to provide a packaging film.

A film can be further oriented beyond the immediate quenching or casting of the film. The process comprises the steps of extruding a laminar flow of molten polymer, quenching the extrudate and orienting the quenched extrudate in at least one or more directions. "Quenched" describes an extrudate that has been substantially cooled below its melting point in order to obtain a solid film material.

The film can be unoriented, oriented in a uniaxial direction (e.g. machine direction), or oriented in a biaxial direction (e.g. machine direction and transverse direction). The film can be biaxially oriented by drawing in two mutually perpendicular directions in the plane of the film to achieve a satisfactory combination of mechanical and physical properties.

Orientation and stretching apparatus to uniaxially or biaxially stretch film are known in the art and may be adapted by those skilled in the art to produce films of the present invention. See, e.g., U.S. Pat. Nos. 3,278,663; 3,337,665; 3,456,044; 4,590,106; 4,760,116; 4,769,421; 4,797,235 and 4,886,634.

A blown film may be oriented using a double bubble extrusion process, where simultaneous biaxial orientation may be effected by extruding a primary tube which is subsequently quenched, reheated and then expanded by internal gas pressure to induce transverse orientation, and drawn by differential speed nip or conveying rollers at a rate which may induce longitudinal orientation.

The processing to obtain an oriented blown film is known in the art as a double bubble technique, and can be carried out as disclosed in U.S. Pat. No. 3,456,044. A primary tube can be melt extruded from an annular die. This extruded primary tube can be cooled quickly to minimize crystallization. It can be then heated to its orientation temperature (for example, by means of a water bath). In the orientation zone of the film fabrication unit a secondary tube is formed by inflation, thereby the film is radially expanded in the transverse direction and pulled or stretched in the machine direction at a temperature such that expansion occurs in both directions, preferably simultaneously; the expansion of the tubing being accompanied by a sharp, sudden reduction of thickness at the draw point. The tubular film is then again flattened through nip rolls. The film can be reinflated and passed through an annealing step (thermofixation), during which step it is heated once more to adjust the shrink properties.

The film can be formed by an extrusion process that causes the polymer chains in the film to be generally aligned in the direction of extrusion. Linear polymers, after being highly oriented uniaxially possess considerable strength in the orientation direction, but less strength in the transverse direction. This alignment can add strength to the film in the direction of extrusion.

The films may or may not be treated by means of corona discharge, ozone or other means standard in the industry.

The seal strength of the multilayer structure to the container can depend on the thickness of the ethylene copolymer-polyolefin heat seal layer. The thickness of the heat seal layer can be between about 10 and 40 µm or about 10 to 30 µm.

The multilayer structures can be useful in a variety of packaging applications as packaging materials. They may also be used as industrial films such as masking films whereby a film is thermally laminated to a substrate, such as foil or polyester or acrylic, and peeled off when surface protection is no longer required.

The packaging materials may also be processed further by, for example but not limited to, printing, embossing, and/or coloring to provide a packaging material to provide information to the consumer about the product therein and/or to provide a pleasing appearance of the package.

Some examples of multilayer film structures of this invention are listed below in which the sealant layer can be prepared from an ethylene copolymer-polyolefin composition disclosed above and wherein "adh" refers to an adhesive system as described above, "tie" refers to an extrudable adhesive or tie layer, and "Ink" refers to the printing described above.

Multilayer film structures include blown films having the structures indicated:
Polyamide (Nylon)/tie/EVOH/tie/Sealant; or
PP/tie/EVOH/tie/Sealant.

Multilayer film structures include adhesive laminated films having the structures indicated:
Ink/Foil/adh/PE/PE/Sealant; or
PET/Ink/adh/PE/tie/EVOH/tie/Sealant.

Multilayer film structures include extrusion-coated films having the structures indicated:
Ink/Foil/tie/Sealant;
PET/PVDC/Ink/tie/Sealant;
Ink/PET/tie/Sealant;
Ink/Paper/PE/Sealant.

Multilayer film structures include extrusion-laminated films having the structures indicated:
PET/PVDC/Ink/tie/Sealant;
PET/adh/Sealant; or
PET/adh/Nylon/tie/Sealant.

The multilayer structures described above may be incorporated into packages, such as lidded containers, by standard methods well known in the art. The multilayer structures can be useful as lidding materials for containers. Packages or containers include molded, pressed or thermoformed containers comprising a structure and/or multilayer structures disclosed above. In addition to the materials listed above, the rigid containers may contain other materials such as, for example, a polymeric resin modified by various additives to provide a modified polymeric blend suitable for preparing containers, such as toughened CPET. The materials can also be modified with other additives such as detesting agents and can also be modified with additives such as fillers. The containers can be multilayer containers containing an innermost product contact layer, an inner layer that can be a barrier or bulking layer and an outer or abuse layer.

Such containers may be used to package products such as yogurts, puddings, custards, gelatins, fruit sauces (for example, applesauce) and the like. They may also be used to package cheese spreads and dips. Packages as described herein may also be used as packages for meats and frozen or refrigerated meals. Packages of this invention also include packages for dry foods such as noodles and seasoning for reconstitution with water. They can also be used to package dry snacks such as cookies, chips and the like.

The following Examples are merely illustrative, and are not to be construed as limiting the scope of the invention.

EXAMPLES

Compositions were prepared from the materials listed below using standard blending techniques to provide Examples 1 through 20 compositions summarized in Tables 1 through 3 below. Comparative Examples were prepared similarly using the materials listed below.

Materials Used

EMA-7: An ethylene/(meth)acrylate (9 weight %) copolymer with MI of 6 available from DuPont.
EMA-8: An ethylene/(meth)acrylate (20 weight %) copolymer with MI of 8 available from DuPont.
EMA-9: An ethylene/(meth)acrylate (13 weight %) copolymer with MI of 9 available from DuPont.
PE-1: A copolymer of ethylene and 1-butene with MI of 3.5 (available as Exact® 3035 from ExxonMobil).
PE-2: A copolymer of ethylene and 1-octene (12 weight % octane) with MI of 3.5 (available as Engage® 8450 from DuPont Dow Elastomers).
Add-1: 2 weight % of silicon dioxide dispersion in an ethylene/methacrylic acid copolymer (available from DuPont as Conpol® 20S2).
Tack-1: A tackifier resin derived from poly-limonene available as Piccolyte® C115 from Pinova.
Tack-2: A tackifier resin available as Regalite R1125 from Eastman.
Filler-1: A blend of 50 weight % of talc and 50 weight % of EMA-8.
Antiox-1: Antioxidant Irganox® 1010.
EVA-1: An ethylene/vinyl acetate (7 weight %) copolymer with MI of 7 available from DuPont.
EVA-2: An ethylene/vinyl acetate (17 weight %) copolymer with MI of 30 available from DuPont.
EVA-3: An ethylene/vinyl acetate (12 weight %) copolymer with MI of 8 available from DuPont.
EVA-4: An ethylene/vinyl acetate (25 weight %) copolymer with MI of 25 available from DuPont.
EVA-5: An ethylene/vinyl acetate (17 weight %) copolymer with MI of 30 available from DuPont.
Ionomer-1: An ethylene/methacrylic acid copolymer partially neutralized with zinc with MI of 14 available from DuPont.

In Tables 1 through 3, amounts listed as parts by weight and "- -" means a component is not present in the composition.

TABLE 1

| Ex. | EMA copolymer | PE-1 | Tack-1 | Add-1 | Antiox-1 |
|---|---|---|---|---|---|
| 1 | EMA-7 | 52.95 | 30 | 15 | 2 | 0.05 |
| 2 | EMA-7 | 62.95 | 20 | 15 | 2 | 0.05 |
| 3 | EMA-7 | 42.95 | 40 | 15 | 2 | 0.05 |
| 4 | EMA-9 | 52.95 | 30 | 15 | 2 | 0.05 |

TABLE 1-continued

| Ex. | EMA copolymer | PE-1 | Tack-1 | Add-1 | Antiox-1 |
|---|---|---|---|---|---|
| 5 | EMA-9 | 67.95 | 30 | — | 2 | 0.05 |
| 6 | EMA-7 | 67.95 | 30 | — | 2 | 0.05 |
| 7 | EMA-9 | 82.95 | — | 15 | 2 | 0.05 |

TABLE 2

| Ex. | EMA copolymer | PE-2 | Tack-1 | Add-1 | Filler-1 | Antiox-1 |
|---|---|---|---|---|---|---|
| 8 | EMA-7 | 50.95 | 27.5 | 15 | 1.5 | 5 | 0.05 |
| 9 | EMA-7 | 45.45 | 23 | 15 | 1.5 | 15 | 0.05 |
| 10 | EMA-7 | 42.95 | 20.5 | 15 | 1.5 | 20 | 0.05 |
| 11 | EMA-7 | 40.45 | 18 | 15 | 1.5 | 25 | 0.05 |
| C12 | EMA-9 | 78.50 | — | — | 1.5 | 20 | — |
| C13 | EMA-9 | 73.50 | — | — | 1.5 | 25 | — |
| C14 | EMA-9 | 68.50 | — | — | 1.5 | 30 | — |
| C15 | EMA-9 | 64.50 | — | — | 1.5 | 35 | — |
| 16 | EMA-7 | 52.95 | 30 | 15 | 2 | — | 0.05 |
| 30 | EMA-7 | 52.95 | 26.25 | 18.75 | 2 | — | 0.05 |
| 31 | EMA-7 | 35.45 | 14.3 | 15.2 | — | 35 | 0.05 |

TABLE 3

| Ex. | EMA copolymer | PE-1 | Tack-1 | Add-1 | Filler-1 | Antiox-1 |
|---|---|---|---|---|---|---|
| C17 | EMA-9 | 85 | — | — | — | 15 | — |
| C18 | EMA-9 | 88 | — | — | 2 | 10 | — |
| C19 | EMA-9 | 83 | — | — | 2 | 15 | — |
| 20 | EMA-9 | 47.95 | 25 | 15 | 2 | 10 | 0.05 |

Table 4 summarizes some heat seal compositions known in the art. They can be described generally as compositions comprising (a) from 20 to 90 parts by weight of at least one ethylene/vinyl acetate copolymer; (b) from 10 to 50 parts by weight of at least one polyolefin; (c) from 1 to 40 parts by weight of at least one tackifying resin; and (d) from 0 to about 50 parts by weight of filler.

TABLE 4

| Comparative Example C1 | Weight % | Comparative Example C2 | Weight % |
|---|---|---|---|
| EVA-1 | 40 | EVA-1 | 40 |
| PE-1 | 40 | PE-2 | 40 |
| Tack-2 | 20 | Tack-2 | 20 |

| Comparative Example C3 | Weight % | Comparative Example C4 | Weight % |
|---|---|---|---|
| EVA-1 | 52 | EVA-1 | 52 |
| PE-1 | 35 | PE-2 | 35 |
| Tack-1 | 10 | Tack-1 | 10 |
| EVA-2 | 3 | EVA-2 | 3 |

| Comparative Example C5 | | Comparative Example C6 | |
|---|---|---|---|
| EVA-1 | 49.95 | EVA-1 | 49.95 |
| PE-1 | 30 | PE-2 | 30 |
| Tack-1 | 15 | Tack-1 | 15 |
| EVA-2 | 5 | EVA-2 | 5 |
| Antiox-1 | 0.05 | Antiox-1 | 0.05 |

TABLE 4-continued

|  | Comparative Example C7 |  | Comparative Example C8 |
|---|---|---|---|
| EVA-3 | 54.95 | EVA-3 | 54.95 |
| PE-1 | 30 | PE-2 | 30 |
| Tack-1 | 15 | Tack-1 | 15 |
| Antiox-1 | 0.05 | Antiox-1 | 0.05 |

Table 5 summarizes some physical properties of the heat seal compositions described herein. Inspection of Table 5 shows that compositions have physical properties that are very similar to those of known heat seal compositions.

TABLE 5

| Composition | Melt Index | Melting point | Vicat softening point |
|---|---|---|---|
| Comp. Ex. C1 | 8 | 94 | 68 |
| Comp. Ex. C2 | 8 | 97 | 67.7 |
| Comp. Ex. C3 | 6.9 | 95 | 72 |
| Comp. Ex. C4 | 6.0 | 95.5 | 70.7 |
| Comp. Ex. C5 | 8.6 | 93 | 66 |
| Comp. Ex. C6 | 9.7 | 94 | 67.5 |
| Comp. Ex. C7 | 8.6 | 93 | 66 |
| Comp. Ex. C8 | 10.3 | 91 | 65.9 |
| Example 1 | 7.1 | 93 | 64 |
| Example 16 | 7.3 | 97 | 65.9 |

Tests Employed in Examples

Melt Index (MI) was measured in accord with ASTM D-1238, condition E, at 190° C., using a 2160-gram weight, with values of MI reported in g/10 minutes. Density was determined in accord with ASTM D-792. Melting point (m.p.) was determined by differential scanning calorimetry (DSC) in accord with ASTM D-3418. Vicat softening point was determined in accord with ASTM D-1525.

Peel Strength: Seal layers were sealed to substrates using standard sealing equipment and conditions to provide one-inch wide sealed strips. The layers were separated at the seal layer/substrate interface unless otherwise noted and pulled in a tensile tester at room temperature in a "T-peel" configuration at a separation speed of 12 inches/minute. The average force required to separate the layers divided by the width is reported as the peel strength (g/inch). Typically, three to five separate determinations were averaged together and reported in the Tables.

The mode of failure reported in Tables 6 through 10 is characterized by the following descriptors:

"P"—peels cleanly away from the substrate

"FT"—film tear (shredding)

"FB"—film break

"CL"—coating lift

"ZP"—zipper peel

"T"—tack

"NT"—no tack

"D"—delamination

Table 6 provides peel data (g/inch, room temperature, 50% relative humidity, average of three repetitions) for a monolayer film comprising the composition of Example 6 sealed to several substrates at the indicated temperatures having one inch seal width, prepared using a Sentinel sealer at 40 psi with a dwell time of one second.

TABLE 6

| Seal | Seal Strength (g/inch) | | | | |
|---|---|---|---|---|---|
| Temperature ° F. | 250 | 300 | 350 | 400 | Failure Mode |
| Crystallized Polyethylene terephthalate | 993 | 1193 | 1667 | 1983 | P |
| Polypropylene homopolymer | 843 | 1450 | 3666 | 3383 | P |
| High-impact polystyrene | 757 | 1067 | 1100 | 1233 | P |

Example 21

A multilayer lidding material of this invention, comprising a 2.0 mil-thick outer layer of foil, a 0.5 mil-thick middle layer of an ethylene acid copolymer having 12 weight % methacrylic acid and a MI of 13.5 (available from DuPont as Nucrel® 1214), and a 1.0 mil-thick inner seal layer of the composition of Example 1, was prepared using standard lamination techniques. Table 7 provides peel data (g/inch, average of five repetitions) for the multilayer lidding material of Example 21 sealed to several substrates at the indicated temperatures. The seals were prepared using a Sentinel sealer at 40 psi with a dwell time of one second to provide a one-inch seal width.

TABLE 7

| Seal | Seal Strength (g/inch) | | | | |
|---|---|---|---|---|---|
| Temperature ° F. | 250 | 300 | 350 | 400 | Failure Mode |
| Crystallized Polyethylene terephthalate | 2385 | 3060 | 2974 | 3133 | P |
| Polypropylene homopolymer | 1431 | 2293 | 3261 | 3298 | P |
| High-impact polystyrene | 1712 | 1179 | 1269 | 1306 | P |
| Seal | After holding at 32° F. for 3 days | | | | |
| Temperature ° F. | 250 | 300 | 350 | 400 | Failure Mode |
| Crystallized Polyethylene terephthalate | 1981 | 2486 | 3113 | 3092 | P |
| Polypropylene homopolymer | 543 | 631 | 4185 | 3918 | P |
| | After holding at 32° F. for 3 days | | | | |
| High-impact polystyrene | 3566 | 3985 P/D(1) | 4333 P/D(1) | 4089 | P |

Comparative Example 22

A multilayer lidding material, comprising a 1.0 mil-thick outer layer of amorphous polyester (available as Mylar LBT from DuPont Teijin Films), a 1.0 mil-thick layer of high density polyethylene, a 0.5 mil-thick layer of a blend of high density polyethylene and low density polyethylene, and a 0.5 mil-thick inner seal layer of the composition of Comparative Example C6, was prepared using standard lamination techniques. Table 8 provides peel data (g/inch, average of five repetitions) for this multilayer lidding material sealed to substrates at the indicated temperatures for comparison to Example 21. The seals were prepared using a Sentinel sealer at 40 psi with a dwell time of one second to provide a one-inch seal width.

TABLE 8

| Seal Temperature ° F. | Seal Strength (g/inch) | | | | |
|---|---|---|---|---|---|
| | 250 | 300 | 350 | 400 | Failure Mode |
| Crystallized Polyethylene terephthalate | 763 | 1111 | 1018 | 1072 | P |
| Polypropylene homopolymer | 831 | 1489 | 2695 | 2913 | P |
| High-impact polystyrene | 545 | 735 | 771 | 741 | P |

| | After holding at 32° F. for 3 days | | | | |
|---|---|---|---|---|---|
| Seal Temperature ° F. | 250 | 300 | 350 | 400 | Failure Mode |
| Crystallized Polyethylene terephthalate | 1212 | 1272 | 867 | 828 | P |
| Polypropylene homopolymer | 104 T | 293 | 852 | 905 | P |
| High-impact polystyrene | 1078 | 1415 | 1393 | 1013 | P |

Comparison of the data in Tables 7 and 8 shows that the invention compositions, when used as a sealant layer, provided stronger, yet still peelable seals than a known sealant and exhibited less reduction in seal strength when held at freezing temperatures.

Example 23 and Comparative Examples 24-26

A film comprising the composition of Example 4 was prepared and heat sealed to a film comprising PCTFE. The seals were prepared using a Sentinel sealer at 40 psi with a dwell time of one second to provide a one-inch seal width.

Table 9 provides peel data (average of 25 repetitions) at room temperature and 50% relative humidity for Example 23. Comparative Examples in Table 9 are lidding materials based on solvent coatings. Comparative Example C24 is a solvent coating based on styrene butadiene and Comparative Example C25 is a solvent coating based on amorphous polyester. Both materials are available from Hueck Folien of Germany.

TABLE 9

| Sample | Temperature | | | | Failure Mode |
|---|---|---|---|---|---|
| | 250° F. | 300° F. | 350° F. | 400° F. | |
| C24 | 0 | 0 | 227 | 372 | 25P |
| Ex. 23 (prepared from Example 4) | 1342 | 1440 | 1574 | 2504 | 25P |
| C25 | 1328 | 1669 | 1719 | 1781 | 23P, 2D |
| C26 | 982 | 953 | 950 | 1051 | 25P |

Inspection of the data in Table 9 shows that Comparative Example C24 provided low strength peelable seals. Comparative Example C25 provided seals of adequate strength, but incidences of delamination indicated the potential for contamination of the product with packaging material. Example 23 provided good strength seals with consistently clean peel seals.

Comparative Example 27 and Example 28

A film prepared according to the description for Example 23 and heat-sealed to a film comprising PCTFE. The PCTFE film was previously thermoformed into blister pack blanks using a Medipak Model CP-21 packaging machine (upper and lower forming temperatures 115° C.). The example films were heat-sealed to the PCTFE face of the formed film at various temperatures at a seal pressure of 2,500 psi and 25 cpm (containers per minute).

Table 10 provides peel data (average of 5 repetitions) at room temperature and 50% relative humidity. Comparative Example C27 used a film comprising the blend used in Comparative Example C26 (Table 9). Although Table 10 indicates that C26 sealed adequately to PCTFE using higher temperatures, it did not seal to the PCTFE film at these low sealing temperatures. Example 28 films heat-sealed and peeled cleanly from the PCTFE film, even using low sealing temperatures.

TABLE 10

| Composition of heat seal layer Seal Temperature ° C. | Comparative Example C27 C26 | Ex. 28 Ex. 4 |
|---|---|---|
| | Average Seal Strength (Grams/0.75 inch)[1] | |
| 125 | 17.7 (no seal) | 920 |
| 150 | 17.7 (no seal) | 841 |
| 175 | 17.7 (no seal) | 952 |
| 200 | 17.7 (no seal) | 983 |

[1]Nominal width of blister pack heat-seal.

Examples 32-36

Compositions were prepared by blending the materials listed in Tables 11 and 12 using standard blending techniques of dry blending followed by melt compounding. A melt-blend of 80 weight % of Tack-1 and 20 weight % of PE-2 was used as the source of Tack-1 (with supplemental PE-2) in these compositions (the amounts reported for those components in Tables 11 and 12 are the total amounts after incorporation of the pre-blend).

TABLE 11

| Ex. | EMA copolymer | PE-2 | Tack-1 | PE-3 | Filler-1 | Antiox-1 |
|---|---|---|---|---|---|---|
| 32 | EMA-7 | 24.95 | 13 | 12 | 25 | 25 | 0.05 |
| 33 | EMA-7 | 14.95 | 18 | 12 | 25 | 30 | 0.05 |
| 34 | EMA-7 | 14.95 | 13 | 12 | 30 | 30 | 0.05 |

TABLE 12

| Ex. | EMA copolymer | PE-2 | Tack-1 | PE-3 | Filler-2 | Antiox-1 |
|---|---|---|---|---|---|---|
| 35 | EMA-7 | 34.95 | 18 | 12 | 25 | 10 | 0.05 |
| 36 | EMA-7 | 34.95 | 13 | 12 | 25 | 15 | 0.05 |

The invention claimed is:
1. A multilayer structure comprising at least one adhesive layer produced from a composition, at least one second layer, and at least one third layer wherein
the adhesive layer forms a peelable seal characterized by interfacial peel failure to the third layer;
the composition consists essentially of (a) from about 10 to about 80 weight % of a combination of an ethylene/alkyl acrylate copolymer and an ionomer of either ethylene/acrylic acid copolymer or ethylene/methacrylic acid copolymer; (b) from about 5 to about 60 weight % of a polyolefin consisting essentially of high density polyethylene, linear low density polyethylene, very low density polyethylene, ultra low density polyethylene, low density polyethylene, or combinations of two or more thereof; (c) from 0 to about 35 weight % of at least one tackifying resin; and (d) from 0 to about 35 weight % of filler;
the second layer comprises or is produced from foil, paper, polyester, polyamide, polyolefin, polyethylene vinyl alcohol, polyethylene vinyl acetate, ethylene/(meth) acrylic acid copolymer, ionomer of ethylene/(meth) acrylic acid copolymer, polyvinyl chloride, polyvinylidene chloride, or anhydride-modified polyolefin; and the third layer comprises or is produced from polypropylene, polystyrene or high-impact polystyrene, expanded polystyrene, acrylic homopolymer, acrylic copolymer, polycarbonate, polysulfone, amorphous polyethylene terephthalate, crystalline polyethylene terephthalate, PVC, polychlorotrifluoroethylene, polyacrylonitrile homopolymer, polyacrylonitrile copolymer, polyacetal, or polyacetal copolymer.

2. The multilayer structure of claim 1 wherein the adhesive layer provides a heat sealable film layer and with the second layer comprises a lidding material for a container comprising the third layer.

3. The multilayer structure of claim 1 wherein the third layer comprises polypropylene, polystyrene, high-impact polystyrene, amorphous polyethylene terephthalate, crystalline polyethylene terephthalate or PVC.

4. The multilayer structure of claim 3 wherein the third layer comprises polypropylene, polystyrene, high-impact polystyrene or PVC.

5. A package or container comprising or produced from a multilayer structure as recited in claim 1.

6. The package or container of claim 5 wherein the third layer comprises polypropylene, polystyrene, high-impact polystyrene, amorphous polyethylene terephthalate, crystalline polyethylene terephthalate, or PVC.

7. The package or container of claim 6 being a blister package, a pouch, a molded, a pressed or thermoformed container and the third layer comprises polypropylene, polystyrene, high-impact polystyrene, or PVC.

* * * * *